US011875772B2

(12) United States Patent
Hsu et al.

(10) Patent No.: US 11,875,772 B2
(45) Date of Patent: Jan. 16, 2024

(54) ADAPTIVE ACTIVE NOISE CONTROL SYSTEM WITH DOUBLE TALK HANDLING AND ASSOCIATED METHOD

(71) Applicant: Airoha Technology Corp., Hsinchu (TW)

(72) Inventors: Chao-Ling Hsu, Hsinchu County (TW); Li-Wen Chi, Hsinchu County (TW)

(73) Assignee: Airoha Technology Corp., Hsinchu (TW)

( * ) Notice: Subject to any disclaimer, the term of this patent is extended or adjusted under 35 U.S.C. 154(b) by 0 days.

(21) Appl. No.: 17/697,919

(22) Filed: Mar. 17, 2022

(65) Prior Publication Data

US 2023/0298560 A1 Sep. 21, 2023

(51) Int. Cl.
*G10K 11/178* (2006.01)

(52) U.S. Cl.
CPC .... *G10K 11/17854* (2018.01); *G10K 11/1783* (2018.01); *G10K 11/17823* (2018.01); *G10K 11/17825* (2018.01); *G10K 11/17881* (2018.01); *G10K 2210/3026* (2013.01); *G10K 2210/3027* (2013.01); *G10K 2210/3028* (2013.01); *G10K 2210/3044* (2013.01)

(58) Field of Classification Search
CPC ....... G10K 11/17854; G10K 11/17815; G10K 11/17817; G10K 11/17823; G10K 11/17825; G10K 11/1783; G10K 11/17833; G10K 11/17835; G10K 11/17879; G10K 2210/3026; G10K 2210/3027
See application file for complete search history.

(56) References Cited

U.S. PATENT DOCUMENTS

| | | | |
|---|---|---|---|
| 9,301,048 B2 * | 3/2016 | Sugiyama ........... G10L 21/0216 |
| 9,502,020 B1 * | 11/2016 | Abdollahzadeh Milani ................ G10K 11/17835 |
| 11,183,166 B1 * | 11/2021 | Basu ................ G10K 11/17857 |
| 2004/0264706 A1 * | 12/2004 | Ray ...................... H04R 1/1008 381/71.11 |
| 2014/0072134 A1 * | 3/2014 | Po .................... G10K 11/17881 381/71.11 |
| 2018/0350381 A1 | 12/2018 | Bryan |

FOREIGN PATENT DOCUMENTS

| | | |
|---|---|---|
| CN | 111524498 A | 8/2020 |
| CN | 113192527 A | 7/2021 |
| CN | 114078480 A | 2/2022 |
| TW | 201506913 A | 2/2015 |

* cited by examiner

*Primary Examiner* — Kile O Blair
(74) *Attorney, Agent, or Firm* — Winston Hsu

(57) ABSTRACT

An adaptive active noise control (ANC) system includes an ANC circuit and a control circuit. The ANC circuit generates an anti-noise signal, and includes at least one adaptive filter. The control circuit receives a first input signal derived from a reference signal output by a reference microphone that picks up ambient noise, receives a second input signal derived from an error signal output by an error microphone that picks up remnant noise resulting from noise reduction, and performs a comparison operation based on a first characteristic value of the first input signal and a second characteristic value of the second input signal to control the at least one adaptive filter.

18 Claims, 5 Drawing Sheets

ADAPTIVE ACTIVE NOISE CONTROL SYSTEM WITH DOUBLE TALK HANDLING AND ASSOCIATED METHOD

BACKGROUND OF THE INVENTION

1. Field of the Invention

The present invention relates to noise reduction/cancellation, and more particularly, to an adaptive active noise control system with double talk handling and an associated method.

2. Description of the Prior Art

Active noise control (ANC) can cancel the unwanted noise based on the principle of superposition. Specifically, an anti-noise signal of equal amplitude and opposite phase is generated and combined with the unwanted noise signal, thus resulting in cancellation of both noise signals at a local quite zone (e.g. user's ear drum). For example, the adaptive ANC algorithm models the transfer function of noise traveling from point A (e.g. a reference microphone) to point B (e.g. an error microphone or user's ear drum), and then converts the ambient noise picked up by point A into an anti-noise signal which can cancel the noise at point B. However, the adaptive ANC algorithm may derive incorrect transfer functions when the cancellation target is not from the ambient noise but other sound sources, such as the voice spoken by the user himself/herself (i.e. near-end speech). This situation is also called "double talk" condition. The incorrect transfer function may not be able to cancel the ambient noise, and may even increase the noise in a worst case.

Thus, there is a need for an innovative adaptive ANC system with double talk handling for keeping an adaptive filter from diverging in the presence of near-end speech.

SUMMARY OF THE INVENTION

One of the objectives of the claimed invention is to provide an adaptive active noise control system with double talk handling and an associated method.

According to a first aspect of the present invention, an exemplary adaptive active noise control (ANC) system is disclosed. The exemplary ANC system includes an ANC circuit and a control circuit. The ANC circuit is arranged to generate an anti-noise signal, wherein the ANC circuit comprises at least one adaptive filter. The control circuit is arranged to receive a first input signal derived from a reference signal output by a reference microphone that picks up ambient noise, receive a second input signal derived from an error signal output by an error microphone that picks up remnant noise resulting from noise reduction, and perform a comparison operation based on a first characteristic value of the first input signal and a second characteristic value of the second input signal to control the at least one adaptive filter.

According to a second aspect of the present invention, an exemplary adaptive active noise control (ANC) method is disclosed. The exemplary ANC method includes: generating, by an ANC circuit, an anti-noise signal, wherein the ANC circuit comprises at least one adaptive filter; receiving a first input signal derived from a reference signal that is generated by picking up ambient noise; receiving a second input signal derived from an error signal that is generated by picking up remnant noise resulting from noise reduction; and performing a comparison operation based on a first characteristic value of the first input signal and a second characteristic value of the second input signal to control the at least one adaptive filter.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the following description and claims, which refer to particular components. As one skilled in the art will appreciate, electronic equipment manufacturers may refer to a component by different names. This document does not intend to distinguish between components that differ in name but not in function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 1:
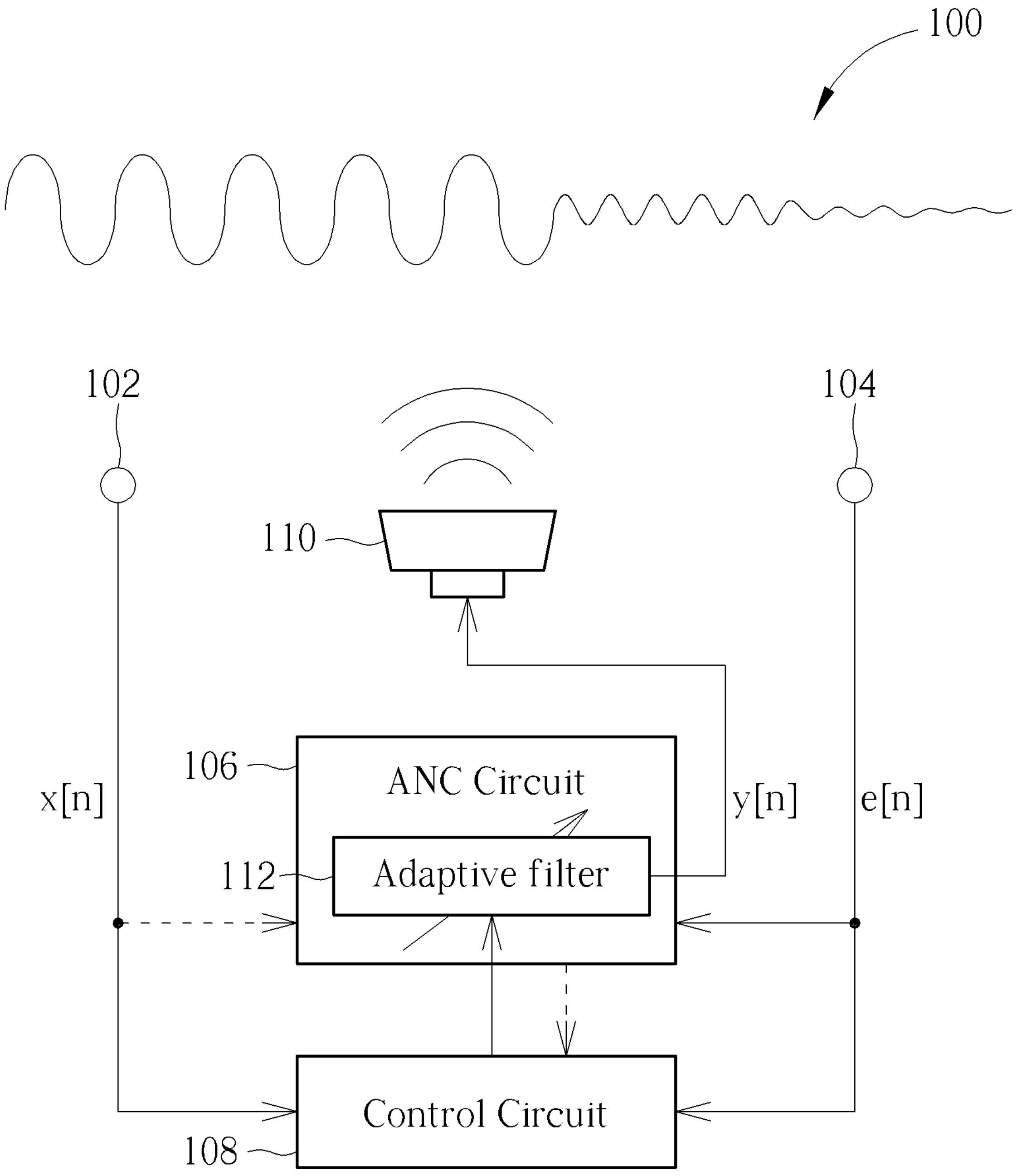
FIG. 1 is a schematic diagram illustrating an adaptive active noise control (ANC) system according to an embodiment of the present invention.

FIG. 1 is a schematic diagram illustrating an adaptive active noise control (ANC) system according to an embodiment of the present invention. The adaptive ANC system 100 may be installed on an earphone such as an earbud. In this embodiment, the adaptive ANC system 100 includes a reference microphone 102, an error microphone 104, an ANC circuit 106, a control circuit 108, and a cancelling loudspeaker 110. The ANC circuit 106 is arranged to generate an anti-noise signal y[n] for noise reduction/cancellation. Specifically, the anti-noise signal y[n] may be a digital signal that is transmitted to the cancelling loudspeaker 110 for playback of analog anti-noise, where the analog anti-noise is intended to reduce/cancel the unwanted ambient noise through superposition. Since an adaptive ANC algorithm is employed by the ANC circuit 106, the ANC circuit 106 includes at least one adaptive filter 112 each arranged to estimate the unknown transfer function of a primary path from the reference microphone 102 to a position where the noise reduction/cancellation is to be realized. For example, the adaptive filter(s) 112 used by the ANC circuit 106 may be least mean square (LMS) based adaptive filter(s). It should be noted that the number of adaptive filters 106 used by the ANC circuit 106 depends on the adaptive ANC structure employed by the ANC circuit 106. For example, the ANC circuit 106 may employ an adaptive feed-forward ANC structure, an adaptive feedback ANC structure, or an adaptive hybrid ANC structure which is a combination of an adaptive feed-forward ANC structure and an adaptive feed-back ANC structure.

The reference microphone 102 is arranged to pick up ambient noise from an external noise source, and generate a reference signal x[n]. The error microphone 104 is arranged to pick up remnant noise resulting from noise reduction/cancellation, and generate an error signal e[n]. One or both of the reference signal x[n] and the error signal e [n] may be used by the ANC circuit 106 for adaptively adjusting filter coefficients of the adaptive filter(s) 112.

In this embodiment, the control circuit 108 is arranged to receive a first input signal derived from the reference signal x[n], receive a second input signal derived from the error signal e[n], and perform a comparison operation based on a first characteristic value of the first input signal and a second characteristic value of the second input signal to control the adaptive filter(s) 112.

For better comprehension of technical features of the present invention, the following assumes that the control circuit 108 is used for double talk handling. When the control circuit 108 is used for double talk handling, the comparison operation performed by the control circuit 108 is for double talk detection, wherein the first characteristic value may be energy of the first input signal, and the second characteristic value may be energy of the second input signal. However, this is for illustrative purposes only, and is not meant to be a limitation of the present invention. That is, the use of control circuit 108 is not limited to double talk handling, and/or the first characteristic value and the second characteristic value are not limited to energy levels. In practice, any adaptive ANC system using the proposed control circuit 108 for controlling the behavior of adaptive filter (s) falls within the scope of the present invention. Furthermore, the first input signal used by the control circuit 108 may be directly set by the reference signal x[n], or may be indirectly obtained after the reference signal x[n] undergoes certain processing. Similarly, the second input signal used by the control circuit 108 may be directly set by the error signal e[n], or may be indirectly obtained after the error signal e[n] undergoes certain processing. These alternative designs all fall within the scope of the present invention.

Figure 2:
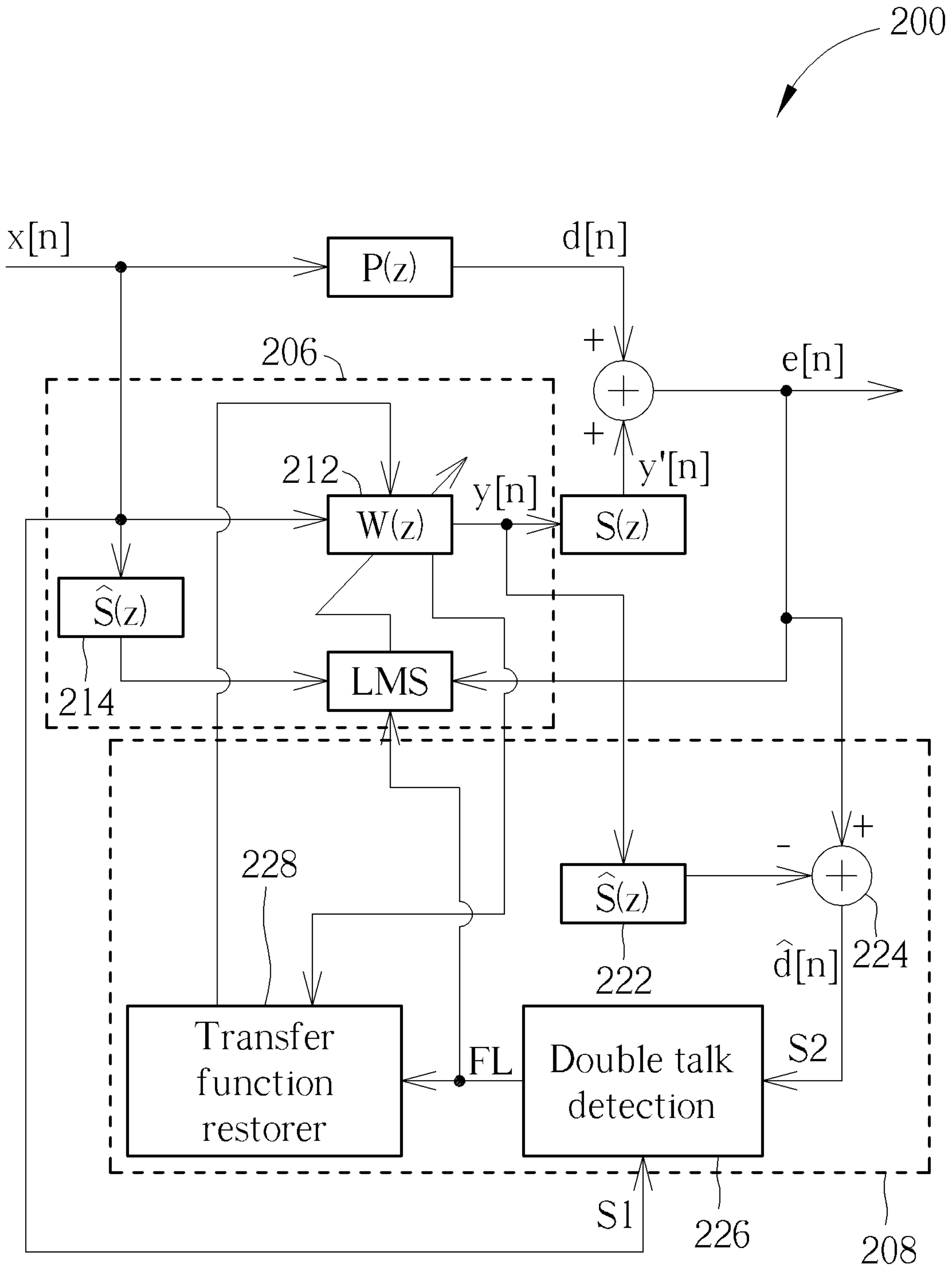
FIG. 2 is a diagram illustrating a first adaptive ANC system with double talk handling according to an embodiment of the present invention.

FIG. 2 is a diagram illustrating a first adaptive ANC system with double talk handling according to an embodiment of the present invention. The adaptive ANC system 200 includes an ANC circuit 206 and a control circuit 208. The ANC circuit 106 shown in FIG. 1 may be realized by the ANC circuit 206. The control circuit 108 shown in FIG. 1 may be realized by the control circuit 208. The transfer function of an acoustic channel, also called the primary path, between the reference signal x[n] (which is the ambient noise picked up by the reference microphone 102) and a noise signal d[n] at a position where noise reduction/cancellation occurs is represented by P(z). The transfer function of an electro-acoustic channel, also called the secondary path, between the anti-noise signal y[n] (which is an output of the ANC circuit 206) and the error signal e[n] (which is the remnant noise picked by the error microphone 104) is represented by S(z). Hence, regarding the acoustic superposition in the space from the ANC circuit 206 to the error microphone 104, there is a signal y'[n] resulting from passing the anti-noise signal y[n] through the secondary path transfer function S(z). In this embodiment, the ANC circuit 206 employs an adaptive feed-forward ANC structure having a filtered-x LMS (Fx-LMS) based adaptive filter 212. The Fx-LMS based adaptive filter 212 has a transfer function W(z) defined by filter coefficients that are adaptively adjusted through the Fx-LMS algorithm. Hence, the ANC circuit 206 further includes a filter 214 having a transfer function $\hat{S}(z)$ which is an estimation of the second path transfer function S(z). The present invention focuses on the control scheme of the adaptive filter 212. Since the adaptive feed-forward ANC using the Fx-LMS algorithm is known to those skilled in the pertinent art, further description is omitted here for brevity.

Regarding the control circuit 208, it includes a filter 222, a combining circuit 224, a double talk detection circuit (labeled by "double talk detection") 226 and a transfer function restoration circuit (labeled by "transfer function restorer") 228. In this embodiment, the filter 222 has a transfer function $\hat{S}(z)$ which is an estimation of the second path transfer function S(z), and the combining circuit 224 is arranged to subtract an output of the filter 222 from the error signal e[n] to generate an estimated signal $\hat{d}[n]$ that is an estimation of d[n] (d[n]=P(z)*x[n], where P(z) is unknown). The double talk detection circuit 226 is arranged to perform double talk detection according to a first input signal S1 derived from the reference signal x[n] and a second input signal S2 derived from the error signal e[n], and generate a flag signal FL that indicates if a double talk event occurs due to near-end speech. In this embodiment, the first input signal S1 is set by the reference signal x[n], and the second input signal S2 is set by the estimated signal $\hat{d}[n]$ output from the combining circuit 224. It should be noted that the filter 222 and the combining circuit 224 may be optional. For example, in one alternative design, the first input signal S1 may be directly set by the reference signal x[n], and the second input signal S2 may be directly set by the error signal e[n]. The same objective of detecting occurrence of a double talk event may still be achieved under certain scenarios. This also falls within the scope of the present invention.

Figure 3:
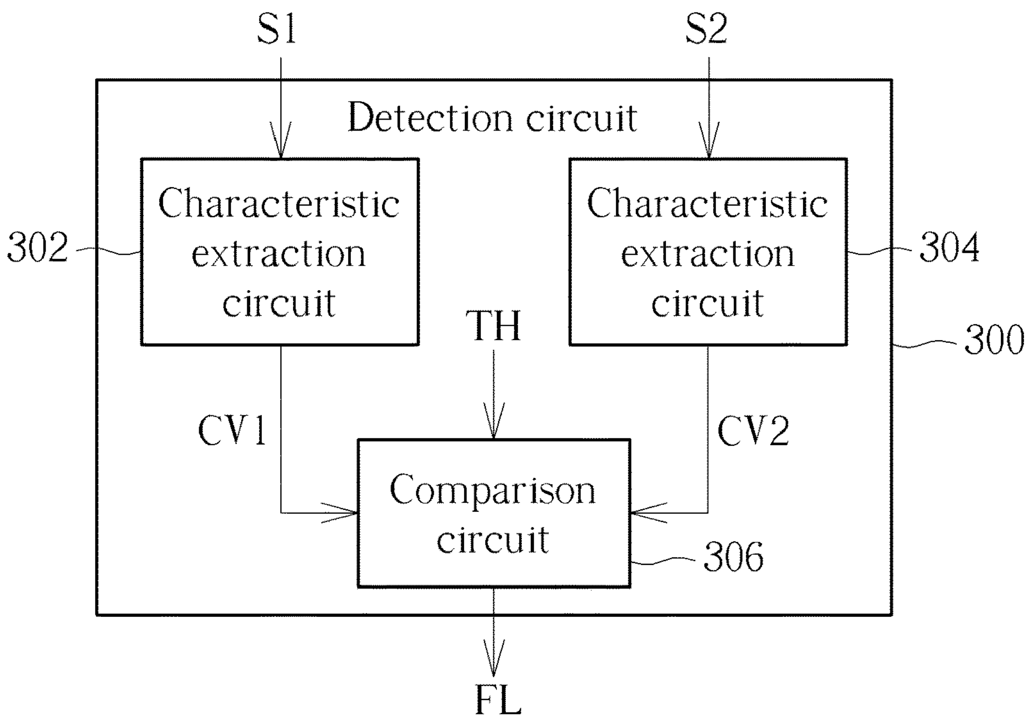
FIG. 3 is a diagram illustrating a detection circuit according to an embodiment of the present invention.

FIG. 3 is a diagram illustrating a detection circuit according to an embodiment of the present invention. Due to inherent characteristics of the near-end speech, energy at a first position (e.g. the position where the error microphone 104 is located) close to the position where noise reduction/cancellation occurs is higher than energy at a second position (e.g. the position where the reference microphone 102 is located) far from the position where noise reduction/cancellation occurs. Based on such observations, the double talk detection circuit 226 may be implemented using the detection circuit 300 shown in FIG. 3. In this embodiment, the detection circuit 300 includes a plurality of characteristic extraction circuits 302, 304 and a comparison circuit 306. The characteristic extraction circuit 302 is arranged to obtain a first characteristic value CV1 of the first input signal S1. The characteristic extraction circuit 304 is arranged to obtain a second characteristic value CV2 of the second input signal S2. The comparison circuit 306 is arranged to compare a ratio between the first characteristic value CV1 and the second characteristic value CV2 with a pre-defined threshold TH to generate a comparison result, set the flag signal FL according the comparison result, and output the flag signal FL to at least the Fx-LMS based adaptive filter 212. For example, the first characteristic value CV1 may be the energy of the first input signal S1, the second characteristic value CV2 may be the energy of the second input signal S2, and the comparison circuit 306 may compare a ratio of the first characteristic value CV1 to the second characteristic value CV2

$$\left(\text{i.e.} \frac{CV1}{CV2}\right)$$

with the pre-defined threshold TH. When the ratio $$\frac{CV1}{CV2}$$

is smaller than the pre-defined threshold TH, the comparison circuit 306 judges that a double talk event occurs at this moment, and sets the flag signal FL by a first logic level (e.g. FL=1). When the ratio $$\frac{CV1}{CV2}$$

is not smaller than the pre-defined threshold TH, the comparison circuit 306 judges that there is no double talk event at this moment, and sets the flag signal FL by a second logic level (e.g. FL=0).

As shown in FIG. 2, the Fx-LMS based adaptive filter 212 is controlled by the flag signal FL. When the flag signal FL has the first logic level (e.g. FL=1) for indicating the presence of the double talk event, the Fx-LMS based adaptive filter 212 may be instructed to freeze coefficient adaptation. That is, the transfer function W(z) estimated by the Fx-LMS based adaptive filter 212 keeps unchanged when the flag signal FL is asserted by the double talk detection circuit 226. When the flag signal FL has the second logic level (e.g. FL=0) for indicating the absence of the double talk event, the Fx-LMS based adaptive filter 212 is instructed to resume coefficient adaptation. That is, the transfer function W(z) estimated by the Fx-LMS based adaptive filter 212 is allowed to be updated by the Fx-LMS algorithm when the flag signal FL is deasserted by the double talk detection circuit 226. Since the coefficient adaptation is frozen during a period in which the double talk detection circuit 226 detects occurrence of the double talk event, the Fx-LMS based adaptive filter 212 is protected from diverging in the presence of the near-end speech.

Generally, the double talk detection requires certain processing time, such that the flag signal FL is asserted later than the start time of the near-end speech. At the time a double talk event is detected by the double talk detection circuit 226, a set of filter coefficients w[n] currently used by the Fx-LMS based adaptive filter 212 may be already affected by the near-end speech and may represent an incorrect transfer function. To address this issue, the present invention proposes using the transfer function restoration circuit 228 to buffer one or more sets of filter coefficients w[n-i] previously used by the Fx-LMS based adaptive filter 212. The transfer function restoration circuit 228 is also controlled by the flag signal FL set by the double talk detection circuit 226, and can be used to correct the transfer function (i.e. filter coefficients) misled by the sound source which is not the ambient noise source.

Figure 4:
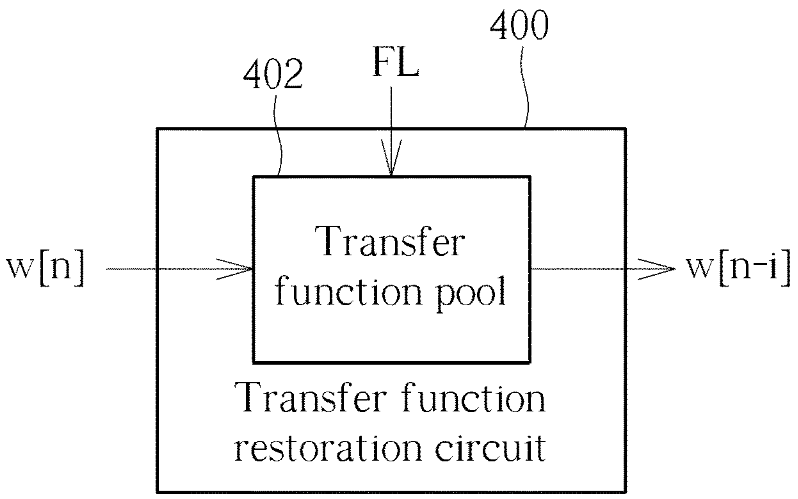
FIG. 4 is a diagram illustrating a transfer function restoration circuit according to an embodiment of the present invention.

FIG. 4 is a diagram illustrating a transfer function restoration circuit according to an embodiment of the present invention. The transfer function restoration circuit 228 shown in FIG. 2 may be realized by the transfer function restoration circuit 400 shown in FIG. 4. The transfer function restoration circuit 400 has a transfer function pool 402 that can be implemented using a storage device such as a memory, and is arranged to periodically buffer a set of filter coefficients w[n] currently used by the Fx-LMS based adaptive filter 212. When the flag signal FL has the first logic level (e.g. FL=1) for indicating the presence of the double talk event, the transfer function restoration circuit 400 (particularly, transfer function pool 402 of transfer function restoration circuit 400) may be instructed to output a set of filter coefficients w[n-i] previously used by the Fx-LMS based adaptive filter 212 to the Fx-LMS based adaptive filter 212 for updating a set of filter coefficients w[n] currently used by the Fx-LMS based adaptive filter 212. Since the set of filter coefficients w[n-i] previously used by the Fx-LMS based adaptive filter 212 may be determined by the Fx-LMS algorithm in the absence of the double talk event, the transfer function restoration applied to the Fx-LMS based adaptive filter 212 can enhance the ANC performance greatly during a period in which a double talk event is detected by the double talk detection circuit 226.

Figure 5:
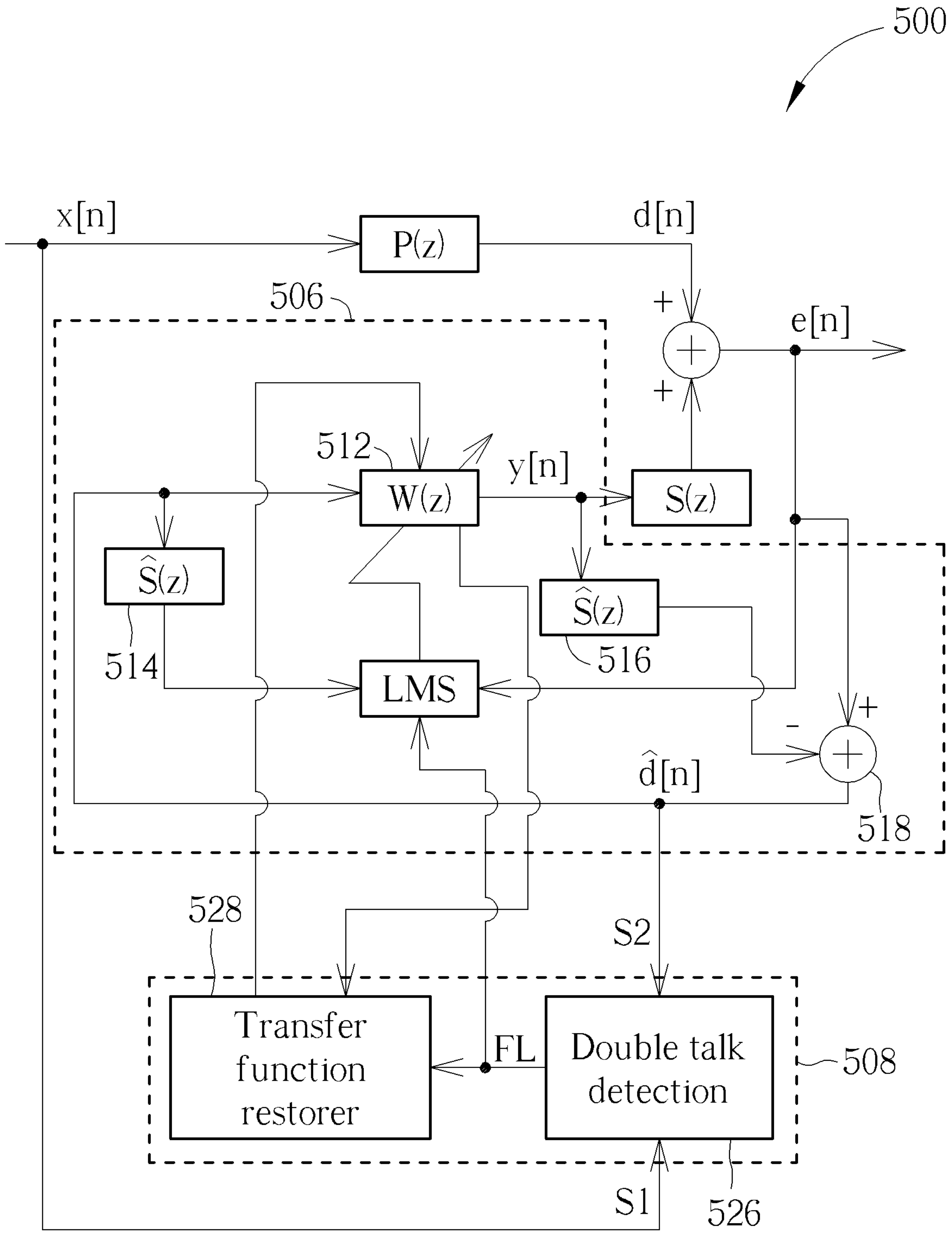
FIG. 5 is a diagram illustrating a second adaptive ANC system with double talk handling according to an embodiment of the present invention.

FIG. 5 is a diagram illustrating a second adaptive ANC system with double talk handling according to an embodiment of the present invention. The adaptive ANC system 500 includes an ANC circuit 506 and a control circuit 508. The ANC circuit 106 shown in FIG. 1 may be realized by the ANC circuit 506. The control circuit 108 shown in FIG. 1 may be realized by the control circuit 508. In this embodiment, the ANC circuit 506 employs an adaptive feedback ANC structure having one Fx-LMS based adaptive filter 512. The Fx-LMS based adaptive filter 512 has a transfer function W(z) defined by filter coefficients that are adaptively adjusted through the Fx-LMS algorithm. Hence, the ANC circuit 506 further includes a filter 514 having a transfer function $\hat{S}(z)$ which is an estimation of the second path transfer function S(z). In this feedback structure, the ANC circuit 506 further includes a filter 516 and a combining circuit 518 jointly used for generating an estimated signal $\hat{d}[n]$ from the measured error signal e [n], wherein the estimated signal $\hat{d}[n]$ represents an estimation of d[n] (d[n] =P(z)*x[n], where P(z) is unknown). It should be noted that the reference signal x[n] (which is the ambient noise picked by the reference microphone 102) is used by the control circuit 508, but is not used by the ANC circuit 506 with the adaptive feedback ANC structure. The present invention focuses on the control scheme of the adaptive filter 512. Since the adaptive feedback ANC using the Fx-LMS algorithm is known to those skilled in the pertinent art, further description is omitted here for brevity.

Regarding the control circuit 508, it includes a double talk detection circuit (labeled by "double talk detection") 526 and a transfer function restoration circuit (labeled by "transfer function restorer") 528. The double talk detection circuit 526 is arranged to perform double talk detection according to a first input signal S1 derived from the reference signal x[n] and a second input signal S2 derived from the error signal e[n], and generate a flag signal FL that indicates if a double talk event occurs. In this embodiment, the first input signal S1 is set by the reference signal x[n], and the second input signal S2 is set by the estimated signal $\hat{d}[n]$ output from the combining circuit 518 included in the adaptive feedback ANC structure. However, this is for illustrative purposes only, and is not meant to be a limitation of the present invention. For example, in one alternative design, the first input signal S1 may be set by the reference signal x[n], and the second input signal S2 may be set by the error signal e[n]. The same objective of detecting occurrence of a double talk event may still be achieved under certain scenarios. This also falls within the scope of the present invention.

In this embodiment, the double talk detection circuit 526 may be realized by the prediction circuit 300 shown in FIG. 3 for double talk detection, and the transfer function restoration circuit 528 may be implemented by the transfer function restoration circuit 400 shown in FIG. 4 for transfer function restoration of the Fx-LMS adaptive filter 512. Since a person skilled in the art can readily understand the principles of double talk detection circuit 526 and transfer function restoration circuit 528 after reading above paragraphs directed to FIG. 3 and FIG. 4, further description is omitted here for brevity.

Figure 6:
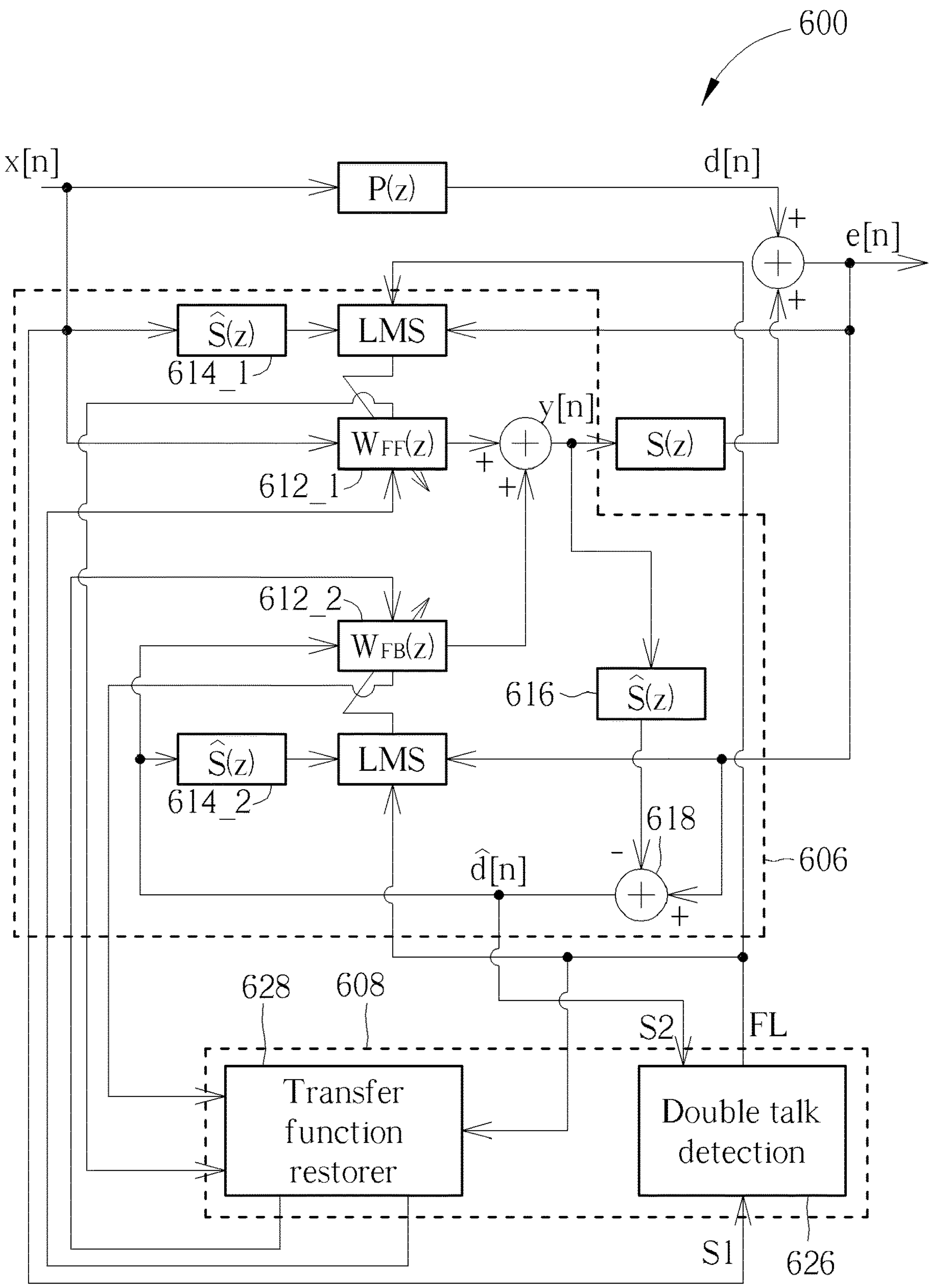
FIG. 6 is a diagram illustrating a third adaptive ANC system with double talk handling according to an embodiment of the present invention.

FIG. 6 is a diagram illustrating a third adaptive ANC system with double talk handling according to an embodiment of the present invention. The adaptive ANC system 600 includes an ANC circuit 606 and a control circuit 608. The ANC circuit 106 shown in FIG. 1 may be realized by the ANC circuit 606. The control circuit 108 shown in FIG. 1 may be realized by the control circuit 608. In this embodiment, the ANC circuit 606 employs an adaptive hybrid ANC structure which is a combination of an adaptive feed-forward ANC structure shown in FIG. 2 and an adaptive feedback ANC structure shown in FIG. 5, and has one Fx-LMS based adaptive filter 612_1 for the adaptive feed-forward ANC structure and another Fx-LMS based adaptive filter 612_2 for the adaptive feedback ANC structure. The Fx-LMS based adaptive filter 612_1 has a transfer function $W_{FF}(z)$ defined by filter coefficients that are adaptively adjusted through the Fx-LMS algorithm. Hence, regarding the adaptive feed-forward ANC structure (which is a part of the adaptive hybrid ANC structure), the ANC circuit 606 includes a filter 614_1 having a transfer function $\hat{S}(z)$ which is an estimation of the second path transfer function S(z). In addition, the Fx-LMS based adaptive filter 612_2 has a transfer function $W_{FB}(z)$ defined by filter coefficients that are adaptively adjusted through the Fx-LMS algorithm. Hence, regarding the adaptive feedback ANC structure (which is another part of the adaptive hybrid ANC structure), the ANC circuit 606 includes a filter 614_2 having a transfer function $\hat{S}(z)$ which is an estimation of the second path transfer function S(z), and further includes a filter 616 and a combining circuit 618 jointly used for generating an estimated signal $\hat{d}[n]$ from the measured error signal e[n], where the estimated signal $\hat{d}[n]$ is an estimation of d[n] ($d[n]=P(z)*x[n]$, where P(z) is unknown). The present invention focuses on the control scheme of the adaptive filters 612_1 and 612_2. Since the adaptive hybrid ANC using the Fx-LMS algorithm is known to those skilled in the pertinent art, further description is omitted here for brevity.

Regarding the control circuit 608, it includes a double talk detection circuit (labeled by "double talk detection") 626 and a transfer function restoration circuit (labeled by "transfer function restorer") 628. The double talk detection circuit 626 is arranged to perform double talk detection according to a first input signal S1 derived from the reference signal x[n] and a second input signal S2 derived from the error signal e[n], and generate a flag signal FL that indicates if a double talk event occurs. In this embodiment, the first input signal S1 is set by the reference signal x[n], and the second input signal S2 is set by the reference signal $\hat{d}[n]$ output from the combining circuit 618 included in the adaptive hybrid ANC structure. However, this is for illustrative purposes only, and is not meant to be a limitation of the present invention. For example, in one alternative design, the first input signal S1 may be set by the reference signal x[n], and the second input signal S2 may be set by the error signal e[n]. The same objective of detecting occurrence of a double talk event may still be achieved under certain scenarios. This also falls within the scope of the present invention.

In this embodiment, the double talk detection circuit 626 may be realized by the prediction circuit 300 shown in FIG. 3 for double talk detection, and the transfer function restoration circuit 628 may be implemented by the transfer function restoration circuit 400 shown in FIG. 4 for transfer function restoration of each of the Fx-LMS adaptive filters 612_1 and 612_2. For example, the transfer function restoration circuit 628 is arranged to periodically buffer a set of filter coefficients currently used by the Fx-LMS based adaptive filter 612_1 and a set of filter coefficients currently used by the Fx-LMS based adaptive filter 612_2. In addition, when the flag signal FL is asserted by the double talk detection circuit 626 in response to the detected double talk event, the transfer function restoration circuit 628 is further arranged to output a set of filter coefficients previously used by the Fx-LMS based adaptive filter 612_1 to update a set of filter coefficients currently used by the Fx-LMS based adaptive filter 612_1, and output a set of filter coefficients previously used by the Fx-LMS based adaptive filter 612_2 to update a set of filter coefficients currently used by the Fx-LMS based adaptive filter 612_2. Since a person skilled in the art can readily understand the principles of double talk detection circuit 626 and transfer function restoration circuit 628 after reading above paragraphs directed to FIG. 3 and FIG. 4, further description is omitted here for brevity.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An adaptive active noise control (ANC) system comprising:

an ANC circuit, arranged to generate an anti-noise signal, wherein the ANC circuit comprises at least one adaptive filter; and a control circuit, arranged to receive a first input signal derived from a reference signal output by a reference microphone that picks up ambient noise, receive a second input signal derived from an error signal output by an error microphone that picks up remnant noise resulting from noise reduction, and perform a comparison operation based on a first characteristic value of the first input signal and a second characteristic value of the second input signal to control the at least one adaptive filter, wherein the control circuit comprises:

a filter, arranged to process the anti-noise signal output from the at least one adaptive filter to generate a filtered anti-noise signal; and a combining circuit, arranged to combine the filtered anti-noise signal and the error signal to generate the second input signal.

2. The ANC system of claim 1, wherein the control circuit further comprises:

a detection circuit, arranged to compare a ratio between the first characteristic value and the second characteristic value with a pre-defined threshold to generate a comparison result, set a flag signal according the comparison result, and output the flag signal to the at least one adaptive filter;

wherein the at least one adaptive filter is controlled by the flag signal.

3. The ANC system of claim 2, wherein in response to the comparison result indicating that the ratio of the first characteristic value to the second characteristic value is smaller than the pre-defined threshold, the detection circuit sets the flag signal for instructing the at least one adaptive filter to freeze coefficient adaptation.

4. The ANC system of claim 2, wherein the control circuit further comprises:

a transfer function restoration circuit, arranged to buffer a set of filter coefficients previously employed by the at least one adaptive filter; and wherein the transfer function restoration circuit is controlled by the flag signal.

5. The ANC system of claim 4, wherein in response to the comparison result indicating that the ratio of the first characteristic value to the second characteristic value is smaller than the pre-defined threshold, the detection circuit sets the flag signal for instructing the transfer function restoration circuit to output the set of filter coefficients previously employed by the at least one adaptive filter for updating a set of filter coefficients currently employed by the at least one adaptive filter.

6. The ANC system of claim 1, wherein the ANC circuit employs an adaptive feed-forward ANC structure.

7. The ANC system of claim 1, wherein the ANC circuit employs an adaptive feedback ANC structure.

8. The ANC system of claim 1, wherein the ANC circuit employs an adaptive hybrid ANC structure which is a combination of an adaptive feed-forward ANC structure and an adaptive feedback ANC structure.

9. An adaptive active noise control (ANC) system comprising:

an ANC circuit, arranged to generate an anti-noise signal, wherein the ANC circuit comprises at least one adaptive filter; and a control circuit, arranged to receive a first input signal derived from a reference signal output by a reference microphone that picks up ambient noise, receive a second input signal derived from an error signal output by an error microphone that picks up remnant noise resulting from noise reduction, and perform a comparison operation based on a first characteristic value of the first input signal and a second characteristic value of the second input signal to control the at least one adaptive filter;

wherein the control circuit is arranged to perform the comparison operation for double talk detection.

10. An adaptive active noise control (ANC) method comprising:

generating, by an ANC circuit, an anti-noise signal, wherein the ANC circuit comprises at least one adaptive filter;

receiving a first input signal derived from a reference signal that is generated by picking up ambient noise;

receiving a second input signal derived from an error signal that is generated by picking up remnant noise resulting from noise reduction, comprising:

applying a filtering operation upon the anti-noise signal output from the at least one adaptive filter to generate a filtered anti-noise signal; and combining the filtered anti-noise signal and the error signal to obtain the second input signal; and performing a comparison operation based on a first characteristic value of the first input signal and a second characteristic value of the second input signal to control the at least one adaptive filter.

11. The ANC method of claim 10, wherein the comparison operation is performed for double talk detection.

12. The ANC method of claim 10, wherein performing the comparison operation based on the first characteristic value of the first input signal and the second characteristic value of the second input signal to control the at least one adaptive filter comprises:

comparing a ratio between the first characteristic value and the second characteristic value with a pre-defined threshold to generate a comparison result;

setting a flag signal according the comparison result; and outputting the flag signal to the at least one adaptive filter;

wherein the at least one adaptive filter is controlled by the flag signal.

13. The ANC method of claim 12, wherein in response to the comparison result indicating that the ratio of the first characteristic value to the second characteristic value is smaller than the pre-defined threshold, the flag signal is set for instructing the at least one adaptive filter to freeze coefficient adaptation.

14. The ANC method of claim 12, further comprising:

buffering a set of filter coefficients previously employed by the at least one adaptive filter; and according to the flag signal, selectively outputting the set of filter coefficients previously employed by the at least one adaptive filter to the at least one adaptive filter.

15. The ANC method of claim 14, wherein in response to the comparison result indicating that the ratio of the first characteristic value to the second characteristic value is smaller than the pre-defined threshold, the flag signal is set to instruct that the set of filter coefficients previously employed by the at least one adaptive filter is output to the at least one adaptive filter for updating a set of filter coefficients currently employed by the at least one adaptive filter.

16. The ANC method of claim 10, wherein the ANC circuit employs an adaptive feed-forward ANC structure.

17. The ANC method of claim 10, wherein the adaptive ANC employs an adaptive feedback ANC structure.

18. The ANC method of claim 10, wherein the adaptive ANC employs a hybrid adaptive ANC structure which is a combination of an adaptive feed-forward ANC structure and an adaptive feedback ANC structure.

* * * * *